United States Patent [19]
Chen et al.

[11] Patent Number: 5,977,248
[45] Date of Patent: Nov. 2, 1999

[54] SHEET AND TUBE SILOXANE POLYMERS CONTAINING A PENDENT ORGANOFUNCTIONAL GROUP

[75] Inventors: Chenggang Chen, Cleveland, Ohio; Dimitris Elias Katsoulis, Midland, Mich.; Malcolm Edward Kenney, Cleveland Heights, Ohio

[73] Assignees: Dow Corning Corporation, Midland, Mich.; Case Western Reserve University, Cleveland, Ohio

[21] Appl. No.: 09/089,701

[22] Filed: Jun. 3, 1998

[51] Int. Cl.$^6$ ...................................... C08K 5/16
[52] U.S. Cl. .................. 524/717; 524/718; 524/726; 524/744; 524/773; 528/10; 528/31; 528/41; 528/42
[58] Field of Search ................ 528/31, 10, 41, 528/42; 524/773, 726, 744, 717, 718

[56] References Cited

U.S. PATENT DOCUMENTS 3,661,846  5/1972  Kenney ...................... 528/10
5,605,982  2/1997  Chao ........................ 525/474
5,627,241  5/1997  Chen ........................ 525/474

OTHER PUBLICATIONS

Polym. Prepr. (Am. Chem. Soc., Div. Polym. Chem.), 1998, 39(1), pp. 497, 498, 514 and 515.

*Primary Examiner*—Melvyn I. Marquis
*Attorney, Agent, or Firm*—James L. De Cesare

[57] ABSTRACT

Gels, cast films, coatings, extruded rods, extruded fibers, compression molded discs, and machined compression molded discs, are made from organopolysiloxane sheet or tube polymers such as an apophyllite-derived 3-cyanopropyldimethyl siloxy sheet polymer of the formula $[((NCC_3H_6)(CH_3)_2SiO)_x(HO)_{1-x}SiO_{1.5}]_n$. Polymers are prepared by contacting sheet or tube silicates with an organohalosilane containing at least one polar group such as cyanoalkyl, acyloxy, or haloalkyl, in the presence of a polar solvent or a mixture of a polar solvent and a non-polar solvent; and heating the mixture until a polymer is formed.

11 Claims, No Drawings

SHEET AND TUBE SILOXANE POLYMERS CONTAINING A PENDENT ORGANOFUNCTIONAL GROUP

CROSS-REFERENCE TO RELATED APPLICATIONS

Not applicable.

REFERENCE TO A MICROFICHE APPENDIX

Not applicable.

STATEMENT REGARDING FEDERALLY SPONSORED RESEARCH OR DEVELOPMENT

Not applicable.

FIELD OF THE INVENTION

This invention is directed to polymers derived from naturally occurring sheet silicates, synthetic sheet silicates, naturally occurring tube silicates, and synthetic tube silicates, which contain a pendent organofunctional group.

BACKGROUND OF THE INVENTION

While U.S. Pat. 5,605,982 (Feb. 25, 1997) describes a process for making organopolysiloxane sheet or tube polymers by contacting a sheet or tube silicate with an alkenyl group containing chlorosilane to form an alkenylsiloxy polymer, it does not teach the reaction of a halosilane with a sheet silicate or a tube silicate, to produce sheet or tube-like organosiloxane polymers containing single pendent groups of the particular type as described herein. The advantage of the single pendent organofunctional group of the particular type described herein on such sheet and tube siloxane polymers is that it allows good control and manipulation of the surface energy of the resulting polymer.

BRIEF SUMMARY OF THE INVENTION

This invention relates to a method of making an organopolysiloxane sheet or tube polymer having a single type of pendent organosilyl group. The method involves contacting a sheet or tube silicate with an organohalosilane, in the presence of a polar solvent or in the presence of a mixture of a polar solvent and a non-polar solvent; and heating the resulting mixture of the sheet or tube silicate, the organohalosilane, and the solvent, until an organopolysiloxane sheet or tube polymer having a single type of pendent organosilyl group is formed. The organohalosilane contains at least one polar group such as cyanoalkyl, acyloxy, or haloalkyl.

The invention also relates to organopolysiloxane sheet or tube polymers prepared according to the above method, gels containing the polymers, and articles of manufacture prepared from the polymers such as cast films, coatings, extruded rods, extruded fibers, compression molded discs, and machined compression molded discs.

The process for forming useful materials involves, first, the complete exfoliation of the sheet organosiloxane polymer or the tube organosiloxane polymer by a solvent that has a strong intermolecular attraction for the polymer. This creates a transparent or a translucent gel. Complete exfoliation has been deduced by increases in viscosity, and by the absence of a low angle powder X-ray diffraction peak which denotes the interlayer distance for a particular sheet or tube polymer.

The gels can then be processed to form (i) oriented films and coatings, in which all sheets are parallel to the substrate surface, by spreading the gel on an appropriate substrate and evaporating the solvent; (ii) fibers by extrusion through an orifice; or (iii) monoliths through compression molding. Fibers and monoliths can be produced from high concentration gels containing in excess of about 85 percent by weight of the solids. In these instances, the solvent serves as a plasticizer. Among polar solvents suitable for processing these polymers are dimethyl sulfoxide, acetone, dimethylformamide, 1-methyl-2-pyrrolidinone, and 1,3-dimethyl-3,4,5,6-tetrahydro-2(1H)-pyrimidione (DMPU). The choice of solvent will depend upon the particular type of polymer being processed.

The compression molded monoliths can be machined by drilling holes in the monoliths, or by cutting the monoliths into various shapes. If desired, "green" materials can be cured by activating the pendent polar groups on the sheet or tube polymer using, for example, thermal cure, electron-beam cure, or peroxide cure systems.

For example, the following types of peroxides can be used as a catalyst in the above curing reaction: diaroyl peroxides such as dibenzoyl peroxide; bis-p-chlorobenzoyl peroxide and bis-2,4-dichlorobenzoyl peroxide; dialkyl peroxides such as di-t-butyl peroxide; diaralkyl peroxides such as dicumyl peroxide; alkylaryl peroxides; alkyl aroyl and alkyl acyl peroxides such as t-butyl perbenzoate or t-butyl peracetate; and mixtures of different types of peroxides such as dibenzoyl peroxide and t-butyl perbenzoate. Peroxysiloxanes and zinc peroxide are other examples of suitable catalysts.

Some examples of representative pendent organofunctional groups which can be used in forming sheet or tube polymers according to this invention are organosilyl groups such as 3-cyanopropyldimethysilyl; 2-acetoxyethyldimethylsilyl; and 4-chlorobutyldimethylsilyl.

The choice of the type of a pendent organofunctional group is important as it will have an impact on the processability of the resulting polymer. For instance, the pendent group may be selected so that the surface energy of the polymer is such that the polymer is compatible with a variety of common organic media, and thus the polymer can be easily processed. In addition, the pendent group may be selected so that the polymer carries a polar function which is capable of taking part in a curing reaction used for forming various types of other end products.

These and other features of the invention will become apparent from a consideration of the detailed description.

DETAILED DESCRIPTION OF THE INVENTION

The present invention describes the preparation of materials such as oriented films, oriented coatings, fibers, and monoliths, made from sheet and tube organofunctional siloxane polymers. The polymers are synthesized by the reaction of a halosilane with a sheet silicate or a tube silicate.

One sheet silicate most preferred to be used herein is the mineral apophyllite $KCa_4Si_8O_{20}(OH,F) \cdot 8H_2O$, while the most preferred tube silicate is a synthetic silicate $K_2CuSi_4O_{10}$. Other natural and synthetic layered and tube silicates can also be used, such as magadiite $Na_2Si_{14}O_{29} \cdot 7H_2O$; kenyaite $Na_2Si_{22}O_{45} \cdot 9H_2O$; silinaite $NaLiSi_2O_5 \cdot 2H_2O$; or chrysotile $Mg_3(OH)_4Si_2O_5$.

The sheet silicate apophyllite $KCa_4Si_8O_{20}(OH,F) \cdot 8H_2O$ and other such silicates are commercially available, and may be purchased from supply houses such as Ward's Natural Science Establishment, Rochester, N.Y., and Gelest, Tullytown, Pa.

Methods of preparing tube silicates such as $K_2CuSi_4O_{10}$ are described in various publications including U.S. Pat. No. 4,942,026 (Jul. 17, 1990); U.S. Pat. 5,605,982 (Feb. 25, 1997); U.S. Pat. 5,627,241 (May 6, 1997); Polymer Preprints (American Chemical Society, Division of Polymer Chemistry) Volume 32(3), Pages 508–509, (1991); and Colloids and Surfaces, Volume 63, Pages 139–149, (1992).

A typical synthesis involves the simultaneous reaction of a monohalosilane (i.e., $R_3SiX$) with a sheet silicate or a tube silicate to produce a sheet-like or tube-like organosiloxane polymer that contains a single type of pendent organofunctional group.

Preferably, the halosilane is a monochlorosilane represented by the formula $R^1R^2R^3SiCl$ where $R^1$, $R^2$, and $R^3$ represent an alkyl group containing 1–30 carbon atoms; another type of non-reactive group such as an aryl group, an alkaryl group, or an aralkyl group; or a reactive group such as cyanoalkyl, acyloxy, or haloalkyl. Representative of other groups which can be used besides an alkyl group are aryl groups such as phenyl and xenyl; alkaryl (alkylaryl) groups such as tolyl and xylyl; and aralkyl (arylalkyl) groups such as benzyl, phenylethyl, and 2-phenylpropyl.

It is also possible to use dichlorosilanes $R^1R^2SiCl_2$ or trichlorosilanes $R^1SiCl_3$ in the reaction with the sheet silicate or the tube silicate, to produce the distinctively structured siloxanes with a single type of polar pendent group.

Most preferably, at least one of the $R^1$, $R^2$, or $R^3$ groups in the monochlorosilane, the dichlorosilane, and the trichlorosilane, should be a polar group. Some examples of chlorosilanes that may be employed according to this invention are 3-cyanopropyldimethylchlorosilane $N \equiv CCH_2CH_2CH_2(CH_3)_2SiCl$, 3-cyanopropyldiisopropylchlorosilane $N \equiv -CCH_2CH_2CH_2[CH(CH_3)_2]_2SiCl$, 2-cyanoethylmethyldichlorosilane $N \equiv CCH_2CH_2(CH_3)SiCl_2$, 3-cyanopropylmethyldichlorosilane $N \equiv CCH_2CH_2CH_2(CH_3)SiCl_2$, 2-cyanoethyltrichlorosilane $N \equiv CCH_2CH_2SiCl3$, 3-cyanopropyltrichlorosilane $N \equiv CCH_2CH_2CH_2SiCl_3$, bis-cyanopropyldichlorosilane $[N \equiv CCH_2CH_2CH_2]_2SiCl_2$, 2-acetoxyethyldimethylchlorosilane $(CH_3COO)CH_2CH_2(CH_3)_2SiCl$, 2-acetoxyethylmethyldichlorosilane $(CH_3COO)CH_2CH_2(CH_3)SiCl_2$, 2-acetoxyethyltrichlorosilane $(CH_3COO)CH_2CH_2SiCl_3$, 3-acetoxypropyldimethylchlorosilane $(CH_3COO)CH_2CH_2CH_2(CH_3)_2SiCl$, bis-(chloromethyl)methylchlorosilane $(ClCH_2)_2(CH_3)SiCl$, 4-chlorobutyldimethylchlorosilane $ClCH_2CH_2CH_2CH_2(CH_3)_2SiCl$, 2-chloroethylmethyldichlorosilane $ClCH_2CH_2(CH_3)SiCl_2$, 1-chloroethyltrichlorosilane $CH_3CHClSiCl_3$, 2-chloroethyltrichlorosilane $ClCH_2CH_2SiCl_3$, [(chloromethyl)phenylethyl]trichiorosilane $ClCH_2C_6H_4CH_2CH_2SiCl_3$, (p-chloromethyl)phenyltrichlorosilane $ClCH_2C_6H_4SiCl_3$, 2-(chloromethyl)propyltrichlorosilane $CH_3CH(CH_2Cl)CH_2SiCl_3$, and chloromethyltrichlorosilane $ClCH_2SiCl_3$.

The reaction is carried out in the presence of a solvent. Some examples of representative polar solvents that are useful herein include th,lp-dimethylforosamide (DMF), dimethyl sulfoxide (DMSO), 1-methyl-2-pyrrolidinone, and 1,3-dimethyl-3, 4, 5,6-tetrahydro-2 (lH) -pyrimidinone (DMPU). The reaction can also be carried out in the presence of a mixture of a polar solvent and a non-polar solvent, such as a mixture of N,N-dimethylformamide and toluene, for example.

The invention will be illustrated in more detail by reference to the following examples which relate to the synthesis, characterization, and processing of an apophyllite-derived 3-cyanopropyldimethylsiloxy sheet polymer of the formula $[((NCC_3H_6)(CH_3)_2SiO)_x(HO)_{1-x}SiO_{1.5}]_n$, abbreviated as A—$CM_2$ for convenience, the polymer gelled with solvents and the polymer plasticized with dimethylsulfoxide. In the example, A—$CM_2$ was prepared on about an 8 g scale. $^{29}Si$ nuclear magnetic resonance (NMR) data indicated that the level of substitution of A—$CM_2$ was about 57%. Scanning electron microscopy (SEM) micrographs showed that A—$CM_2$ was composed of crumpled stacks of sheets. Nuclear magnetic resonance (NMR) data from a dimethylformamide gel of A—$CM_2$ provided confirmatory evidence for its structure. Opacity data from gels of A—$CM_2$ with various solvents and a solvent mixture indicated that the index of refraction of A—$CM_2$ was 1.48±0.02.

As will also be illustrated hereafter in the accompanying examples, acetone gels of A—$CM_2$ can be used to form a film in which the sheets of A—$CM_2$ orient predominantly parallel to the film surface, a coating in which the sheets of A—$CM_2$ orient predominantly parallel to the coating surface, a patterned coating, and a rod. In addition, A—$CM_2$ can be plasticized with dimethyl sulfoxide, and the plasticized polymer can be formed into a disc, a fiber, or a machined object. Processing techniques used in the examples with the acetone gel of A—$CM_2$ include casting, spreading and extrusion, while those used with the plasticized polymer of A—$CM_2$ include compression molding, extrusion, drilling, and cutting.

EXAMPLES

EXAMPLE I—Synthesis of Apophyllite-Derived 3-Cyanopropyldimethylsiloxy Sheet Polymer, i.e., $[((NCC_3H_6)(CH_3)_2SiO)_x(HO)_{1-x}SiO_{1.5}]_n$, A—$CM_2$, in Dimethylformamide A suspension of apophyllite (120 mesh, 7.5 g, 8.3 mmol), 3-cyanopropyldimethylchlorosilane (52 mL, 0.32 mol), and dimethylformamide (280 mL) was refluxed for 4 h and filtered. The solid was washed with hexane (100 mL), acetone (160 mL), a solution of water and acetone (1:1, 600 mL), and acetone (100 mL), dried (60 torr, 60° C.), and weighed (7.8 g). The following are the product powder X-ray diffractometry (XRD) data $(d(Å)(I/I_0))$: 19.0 (100). The following are the product infrared (IR) data (evaporated acetone-gel coating on KBr, $cm^-$): 3414 (w br, H-bonded OH stretch), 2958 (m, CH stretch), 2887 (m, CH stretch), 2246 (m, CN stretch), 1454 (w), 1426 (m, CH deformation), 1346 (w, CH deformation), 1258 (s, $SiCH_3$), 1066 (vs br, SiO stretch), 840 (s), 736 (w), 674 (w), 582 (w), 434 (s). The following are the product $^{29}Si$ nuclear magnetic resonance (NMR) data (400 MHz, solid state MAS δ): 13.10 (s, $Si(CH_3)_2(C_3H_6CN)$), -100.75 (s, $Si(OH)O_3$), -109.74 (s, $SiO_4$).

The synthesis of A—$CM_2$ in Example I on a moderate scale, that is, on a ca. 8 g scale proceeded smoothly. The success of this moderately-scaled synthesis indicates that A—$CM_2$ can be synthesized on larger scales. The X-ray diffraction, infrared and nuclear magnetic resonance data for A—$CM_2$ support its formulation as a sheet polymer. The substitution level of the A—$CM_2$ polymer was calculated to be 57% on the basis of the areas of the $Si(CH_3)_2(C_3H_6CN)$ and $Si(OH)O_3$ nuclear magnetic resonance peaks. Scanning electron microscopy (SEM) micrographs of A—$CM_2$, showed that the polymer as prepared in Example I was composed of particles of ca. 5–80 μ (micron/micrometer) in size. These particles were made up of crumpled stacks of sheets.

EXAMPLE II—Synthesis of Apophyllite-Derived 3-Cyanopropyldimethylsiloxy Sheet Polymer, i.e., $[((NCC_3H_6)(CH_3)_2SiO)_x(HO)_{1-x}SiO_{1.5}]_n$, A—$CM_2$, in Toluene-Dimethylformamide Solvent Mixture A suspension of apophyllite (120 mesh, 0.50 g, 0.55 mmol), 3-cyanopropyldimethylchlorosilane (4.0 mL, 24 mmol), dimethylformamide (1.5 mL), and toluene (13.5 mL), was refluxed for 5.5 h and filtered. The solid was washed with acetone (50 mL), a $H_2O$-acetone solution (1:1, 100 mL), and acetone (25 mL), dried, and weighed (~0.45 g). The following are the product powder X-ray diffraction (XRD) data ($d(Å)(I/I_0)$): 17.2. The following are the product infrared (IR) data (Fluorolube, Nujol mulls, $cm^{-1}$): 3388 (m br, H-bonded OH stretch), 2958 (m, CH stretch), 2884 (w, CH stretch), 2246 (m, CN stretch), 1426 (m, CH deformation), 1261 (s, $SiCH_3$ deformation), 1070 (vs br, SiO stretch), 841 (s), 723 (m), 555 (vw), 434 (s).

In Example II, the successful preparation of A—$CM_2$ in a dimethylformamide-toluene solvent mixture containing as little as 10% DMF, suggests that the silylation reaction involves the intercalation of the apophyllite sheets by the polar dimethylformamide, and then the reaction of the intercalated apophyllite sheets with the chlorosilane, through transformations involving protonation and silylation, believed to proceed as shown below:

$$KCa_4Si_8O_{20}(F,OH) \cdot 8H_2O + DMF \rightarrow KCa_4Si_8O_{20}(F,OH) \cdot 8H_2O \cdot xDMF \quad (1)$$

$$KCa_4Si_8O_{20}(F,OH) \cdot 8H_2O \cdot xDMF + H^+ \rightarrow [(HO)SiO_{1.5} \cdot xDMF]_n \quad (2)$$

$$[(HO)SiO_{1.5} \cdot xDMF]_n + R_3SiCl \rightarrow [(R_3SiO)_x(HO)_{1-x}SiO_{1.5}]_n \quad (3)$$

From a practical standpoint, the successful preparation of A—$CM_2$ in Example II using a low content of dimethylformamide in a mixture with toluene is important commercially, because toluene is easy to handle in large scale reactions.

EXAMPLE III—Gels of A—$CM_2$

Mixtures of A—$CM_2$ and a solvent were prepared and allowed to stand for $\geq 4$ h. The following are the $^1H$ nuclear magnetic resonance (NMR) data for a dimethylformamide (DMF) gel: (200 MHz, DMF-$d_7$ gel, δ): 0.11 (s, $CH_3$), 0.72 (m, α-$CH_2$), 1.67 (m, β-$CH_2$), 2.57 (m, γ-$CH_2$). The following are the 13C nuclear magnetic resonance (NMR) data for a dimethylformamide (DMF) gel (200 MHz, DMF-$d_7$ gel, δ): 0.25 ($CH_3$), 18.03 (α-CH2), 20.28 (β-CH2), 20.57 (γ-$CH_2$), 104.1 (vw, CN). Some selected properties of a group of gels prepared are shown below in Table I.

TABLE I

A-$CM_2$ Gels

| formula | solvent name | $ACM_2$ to solvent ratio | color | opacity | viscosity | solvent $n_D$ |
|---|---|---|---|---|---|---|
|  $CH_3\overset{O}{\overset{\|}{C}}CH_3$ | acetone | 1:10 | white | opaque | high | 1.359 |
|  $H\overset{O}{\overset{\|}{C}}N(CH_3)_2$ | N,N-dimethylformamide | 1:10 | white | cloudy | high | 1.430 |
| 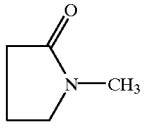 | 1-methyl-2-pyrrolidinone | 1:10 | colorless | clear | high | 1.470 |
| 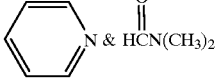 $N \& H\overset{O}{\overset{\|}{C}}N(CH_3)_2$ | pyridine and dimethylformamide | 1:10 | colorless | clear | high | 1.478 |
|  $CH_3\overset{O}{\overset{\|}{S}}CH_3$ | dimethyl sulfoxide | 1:10 | colorless | clear | high | 1.479 |
| 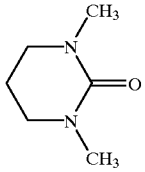 | 1,3-dimethyl-3,4,5,6-tetrahydro-2(1H)-pyrimidinone | 1:10 | colorless | clear | high | 1.488 |

TABLE I-continued

A-CM₂ Gels

| formula | solvent name | ACM₂ to solvent ratio | color | opacity | viscosity | solvent $n_D$ |
|---|---|---|---|---|---|---|
|  | pyridine | 1:10 | white | cloudy | high | 1.509 |
| 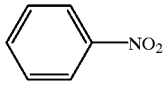 | nitrobenzene | 1:10 | pale yellow | cloudy | high | 1.551 |

The synthesis of A—CM₂ gels involves simply mixing the A—CM₂ polymer and a solvent or a solvent mixture, and allowing the resultant mixture to stand at about room temperature (18–25° C.) or above for a time sufficient for gelation to occur. During the process, exfoliation of the polymer sheets takes place, and solvent intercalates the polymer sheets. As used herein, the term "exfoliated" is intended to mean a complete separation or disassociation of individual layers, such that individual layers separate from one another, as well as lose their ordered arrangement.

Whether or not the sheets are very lightly cross linked and held together in a tenuous fashion has not been determined. These gels possess a new type of construction, and have an advantage in that a solvent is trapped by the polymer sheets, rather than by polymer chains as in ordinary gels. Solvents able to form gels with A—CM₂ are those solvents that like A—CM₂ have polar functional groups.

The nuclear magnetic resonance data for the A—CM₂ DMF-d₇ gel showed that useful proton spectra of A—CM₂ can be obtained from DMF-d₇ gels of it, and provide additional confirmation of the presence of pendent 3-cyanopropyldimethyl groups in A—CM₂.

As can be seen in Table I, a number of the gels with an ca. 1:10 A—CM₂-to-solvent ratio were quite viscous, showing that the polymer sheets were efficient at trapping the polar solvents. As also can be seen in Table I, the opacity of the selection of gels shown ranged from opaque to clear.

It can be concluded on the basis of the data for the gels in Table I, that the gels scatter light, and are cloudy or opaque when the indices of refraction of the A—CM₂ polymer and solvent are mismatched, but clear when they are matched, and further that the index of refraction of the polymer is 1.48±0.02. For example, dimethylformamide ($n_D$=1.430) and pyridine ($n_D$=1.509) give cloudy gels, while a 1:1.6 dimethylformamide-pyridine solution ($n_D$=1.478) gives a clear gel.

EXAMPLE IV—Oriented Cast Film of A—CM₂

A—CM₂ acetone gel was spread on Teflon® tape and allowed to stand in the open for 48 h. The resulting film was gently lifted from the tape. The following are the film powder X-ray diffractometry (XRD) data (d(Å)(I/I₀)): 19.1 (100), 9.4 (0.6), 4.3 (br 0.8). The following are the film X-ray photoelectron spectroscopy (XPS) data (binding energy, eV): 1002 (OK LL), 979.6 (OK LL), 532.8 (O 1s), 400.0 (N is), 285.6 (C is), 154.4 (Si 2s), 103.6 (Si 2p), 25.20 (o 2s, N 2p, C 2s). The film was white, translucent and flexible, and it could be cut cleanly with scissors.

The formation of a film of A—CM₂ from an acetone gel in Example IV showed that A—CM₂ can be processed by gel-casting techniques. While the position of the reflection arising from the intersheet spacing was the same within experimental error for the film and the packed bulk polymer, i.e., 19.1 and 19.0 Å, respectively, the intensity of the reflection for the film was much greater than for the bulk polymer under similar experimental conditions, i.e., 10211 vs 2225 cps, respectively.

Hence, it can be concluded that the sheets in the film were predominantly oriented parallel to the film surface given the probable high aspect ratio of the sheets. The ability of the film to retain its integrity during cutting was consistent with it being composed of relatively densely packed sheets oriented parallel to the film surface, and showed that the film was reasonably tough.

The 103.6 eV Si 2p peak of the X-ray photoelectron spectrum (XPS) was deconvoluted into Gaussian peaks at 103.1 and 101.1 eV. With the assignment of the 103.1 peak to the Si of the SiO₄ and SiO₃OH groups and the 101.1 peak to the Si of the Si(CH₃)₂(C₃H₆CN) group, the substitution level of the A—CM₂ was calculated to be 50%. This substitution-level value is in agreement within experimental error with the value obtained from the ²⁹Si nuclear magnetic resonance data.

EXAMPLE V—Oriented Coating of A—CM₂

A—CM₂ acetone gel was spread on a glass microscope slide and allowed to stand in the open for 48 h. The following are the product powder X-ray diffractometry (XRD) data (d(Å)(I/I₀)): 18.6 (100). The coating was cloudy, translucent, soft, and adherent.

The formation of a coating of A—CM₂ on a glass slide further showed that A—CM₂ can be processed by gel-spreading techniques. The position of the intersheet reflection was similar for the coating and the bulk polymer, i.e., 18.6 and 19.0 Å, respectively. However, the intensity of the reflection for the coating was considerably larger than for the bulk polymer under similar conditions, i.e., 5851 vs 2225 cps, respectively. This showed that the sheets in the coating were predominantly oriented parallel to the coating surface, and was consistent with it being composed of relatively densely packed sheets oriented parallel to the coating surface. The ability of the coating to retain its integrity during mild abrasion showed that it was moderately adherent and tough.

EXAMPLE VI—Patterned Coating of A—CM₂

A—CM₂ acetone gel was spread on a microscope slide masked with a stencil, and the assembly was allowed to stand in the open for 48 h. The stencil was then carefully lifted off. The coating formed had the pattern imposed by the stencil. It was white, translucent, soft, and adherent. The formation of a patterned coating of A—$CM_2$ in this example showed that A—$CM_2$ coatings can be laid down in a highly controlled fashion.

EXAMPLE VII—Extruded Rod of A—$CM_2$

A—$CM_2$ acetone gel was extruded through the open end of a 2 mL syringe with a 0.125 in. orifice onto a microscopic slide, and allowed to stand in the open for 48 h. The resulting rod was carefully lifted from the slide. The rod was white, opaque, weak, and brittle.

The formation of a rod from the A—$CM_2$ gel in this example demonstrated that shaped objects of A—$CM_2$ can be made with a gel-forming technique. In contrast to the films formed from the gel in Examples IV–VI, the rod was quite porous and had a low density.

EXAMPLE VIII—DMSO-Plasticized A—$CM_2$

Mixtures of A—$CM_2$ and solutions of dimethyl sulfoxide in acetone were prepared and allowed to stand in the open for $\geq 96$ h. The preparation of a dimethyl sulfoxide plasticized A—$CM_2$ in this example involved simply mixing the A—$CM_2$ polymer with the acetone-dimethyl sulfoxide solution, and allowing the acetone to evaporate. Some selected properties of the resulting A—$CM_2$ polymer plasticized with various percentages of dimethyl sulfoxide, a solvent which has a boiling point of 189° C., are shown below in Table II.

TABLE II

DMSO Plasticized A-$CM_2$

| DMSO (%) | color | opacity | texture | interplanar spacing (Å) |
|---|---|---|---|---|
| 0 | white | opaque | semisoft | 18.4 |
| 19 | light-tan | translucent | soft | 21.3 |
| 28 | light-tan | translucent | soft | 21.5 |
| 90 | colorless | transparent | gel | — |

In Table II, the X-ray diffraction data on A—$CM_2$ plasticized with varying percentages of dimethyl sulfoxide showed that as the percentage of dimethyl sulfoxide increased, the line corresponding to the intersheet spacing broadened and moved to larger d-spacing values (i.e., smaller 2 $\theta$ values). This indicated that dimethyl sulfoxide intercalates essentially simultaneously between most of the sheets in the A—$CM_2$ plasticized polymer, and that few, if any, islands of unsolvated A—$CM_2$ polymer remain.

As used herein, the term "plasticizer" is intended to mean a substance incorporated in a material such as a polymer or elastomer to increase its flexibility, workability, or distensibility. It may reduce the melt viscosity of the material, or lower its temperature of the second-order transition Tg, or its elastic modulus.

EXAMPLE IX—Extruded DMSO-Plasticized Fibers of A—$CM_2$

A—$CM_2$ polymer plasticized with 14% dimethyl sulfoxide was extruded with a custom-made hand extruder having a 0.040 in. (1.0 mm) orifice. The resulting fiber was tan, translucent, moderately strong, and flexible.

The formation of a fiber of plasticized A—$CM_2$ by extrusion showed that the plasticized A—$CM_2$ can be readily formed into shapes. The fiber had a substantial density and a low porosity. Its relatively good flexibility and strength were consistent with its density and porosity, and with the existence of strong interactions between the sheets and the dimethyl sulfoxide.

EXAMPLE X—Compression-Molded DMSO-Plasticized Discs of A—$CM_2$

A—$CM_2$ polymer plasticized with various percentages of dimethyl sulfoxide was compressed between circles of self-adhesive label-backing paper in a 13 mm KBr die at 3000 psi for 5 min. Some selected properties of the resulting molded discs are shown below in Table III.

TABLE III

Compression-Molded DMSO-Plasticized Discs of A-$CM_2$

| DMSO (%) | color | opacity | mechanical behavior | texture |
|---|---|---|---|---|
| 0 | white | opaque | brittle | semisoft |
| 5 | light-tan | translucent | flexible | soft |
| 14 | light-tan | translucent | flexible | soft |
| 19 | light-tan | translucent | flexible | very soft |
| 28 | light-tan | translucent | flexible | very soft |

The preparation of discs of plasticized A—$CM_2$ polymer by compression molding further shows that plasticized A—$CM_2$ can be readily formed into shapes. The increasing flexibility of the discs with increasing percentages of the dimethyl sulfoxide plasticizer is apparent from Table III.

EXAMPLE XI—Machined Compression-Molded DMSO-Plasticized Disc

A compression molded disc of A—$CM_2$ polymer plasticized with 19% dimethyl sulfoxide was drilled with a #50 (0.070 in./1.8 mm) and a #60 (0.040 in./1.0 mm) high-speed drill, and cut with a razor blade. The holes were somewhat rough, but the cuts were smooth.

The ability of compression molded plasticized A—$CM_2$ polymer discs to be formed by drilling and cutting showed that plasticized A—$CM_2$ was a reasonably tough material, and that it could be shaped by ordinary machining operations.

It should be apparent from the foregoing, that the XRD, IR, XPS, SEM, and NMR data on A—$CM_2$ support the formulation of A—$CM_2$ as a sheet polymer with a siloxane backbone and pendent $OSi(CH_3)_3(CH_2)_3CN$ groups. The A—$CM_2$ gel data and the plasticized A—$CM_2$ data support the belief that upon gelation or plasticization, the sheets of the A—$CM_2$ polymer are exfoliated. Processing data on acetone gels of A—$CM_2$ show that the polymer can be formed by shaping the gel, and then allowing the acetone to evaporate; while processing data on the dimethyl sulfoxide-plasticized A—$CM_2$ polymer show that it can be formed by extrusion, compression molding, and machining. Thus, it is evident that the A—$CM_2$ polymer can be readily processed by a variety of techniques.

The explanation of this invention, as it relates to polymers such as A—$CM_2$, in particular, can be appreciated by reference to a structure shown below, believed to be representative of this apophyllite-derived 3-cyanopropyldimethylsiloxy sheet polymer.

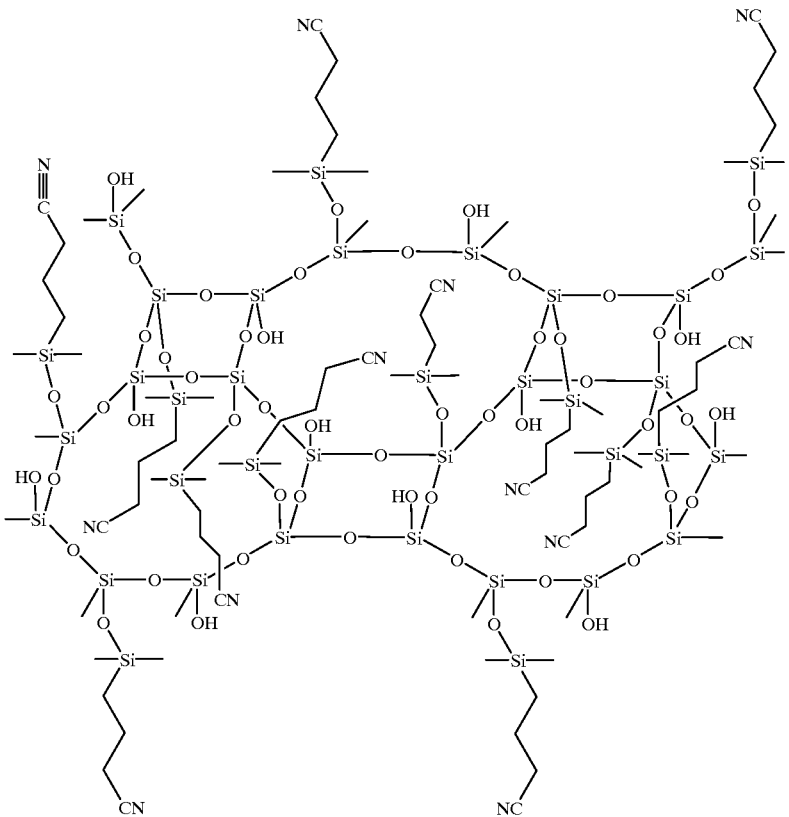

Such materials as described herein can be used as preceramic polymers, fire resistance materials, coatings, barriers for gases, and bulk molding compounds.

Other variations may be made in compounds, compositions, and methods described herein without departing from the essential features of the invention. The embodiments specifically illustrated herein are exemplary only and not intended as limitations on their scope except as defined in the appended claims.

We claim:

1. A method of making an organopolysiloxane sheet or tube polymer having a single type of pendent organosilyl group comprising contacting a sheet or tube silicate with an organohalosilane, in the presence of a polar solvent or in the presence of a mixture of a polar solvent and a non-polar solvent; and heating the resulting mixture of the sheet or tube silicate, the organohalosilane, and the solvent, until an organopolysiloxane sheet or tube polymer having a single type of pendent organosilyl group is formed; the organohalosilane containing at least one polar functional group selected from the group consisting of cyanoalkyl, acyloxy, and haloalkyl.

2. A method according to claim 1 in which the organohalosilane is a monochlorosilane having the formula $R^1R^2R^3SiCl$, wherein $R^1$, $R^2$, and $R^3$ represent an alkyl group containing 1-30 carbon atoms; an aryl group; an alkaryl group; an aralkyl group; or a polar functional group selected from the group consisting of cyanoalkyl, acyloxy, and haloalkyl; with the proviso that at least one of $R^1$, $R^2$, and $R^3$, is cyanoalkyl, acyloxy, or haloalkyl.

3. A method according to claim 1 in which the organohalosilane is (i) a monochlorosilane having the formula $R^1R^2R^3SiCl$; (ii) a dichlorosilane having the formula $R^1R^2SiCl_2$; or (iii) a trichlorosilane having the formula $R^1SiCl_3$; wherein $R^1$, $R^2$, and $R^3$ represent an alkyl group containing 1-30 carbon atoms; an aryl group; an alkaryl group; an aralkyl group; or a polar functional group selected from the group consisting of cyanoalkyl, acyloxy, and haloalkyl; with the proviso that at least one of $R^1$, $R^2$, and $R^3$, is cyanoalkyl, acyloxy, or haloalkyl.

4. A method according to claim 1 in which the organohalosilane is a compound selected from the group consisting of 3-cyanopropyldimethylchlorosilane N≡CCH$_2$CH$_2$CH$_2$(CH$_3$)$_2$SiCl, 3-cyanopropyldiisopropylchlorosilane N≡CCH$_2$CH$_2$CH$_2$[CH(CH$_3$)$_2$]$_2$SiCl, 2-cyanoethylmethyldichlorosilane N≡CCH$_2$CH$_2$(CH$_3$)SiCl$_2$, 3-cyanopropylmethyldichlorosilane N≡CCH$_2$CH$_2$CH$_2$(CH$_3$)SiCl$_2$, 2-cyanoethyltrichlorosilane N≡CCH$_2$CH$_2$SiCl$_3$, 3-cyanopropyltrichlorosilane N≡CCH$_2$CH$_2$CH$_2$SiCl$_3$, bis-cyanopropyldichlorosilane [N≡CCH$_2$CH$_2$CH$_2$]$_2$SiCl$_2$, 2-acetoxyethyldimethylchlorosilane (CH$_3$COO)CH$_2$CH$_2$(CH$_3$)$_2$SiCl, 2-acetoxyethylmethyldichlorosilane (CH$_3$COO)CH$_2$CH$_2$(CH$_3$)SiCl$_2$, 2-acetoxyethyltrichlorosilane (CH$_3$COO)CH$_2$CH$_2$SiCl$_3$ 3-acetoxypropyldimethylchlorosilane (CH$_3$COO)CH$_2$CH$_2$CH$_2$(CH$_3$)$_2$SiCl, bis-(chloromethyl)methylchlorosilane (ClCH$_2$)2(CH$_3$)SiCl, 4-chlorobutyldimethylchlorosilane ClCH$_2$CH$_2$CH$_2$CH$_2$(CH$_3$)$_2$SiCl, 2-chloroethylmethyldichlorosilane ClCH$_2$CH$_2$(CH$_3$)SiCl$_2$, 1-chloroethyltrichlorosilane CH$_3$CHClSiCl$_3$, 2-chloroethyltrichlorosilane CH$_3$CHClSiCl$_3$, [(chloromethyl)phenylethyl]trichlorosilane ClCH$_2$C$_6$H$_4$CH$_2$CH$_2$SiCl$_3$, (p-chloromethyl)phenyltrichlorosilane ClCH$_2$C$_6$H$_4$SiCl$_3$, 2-(chloromethyl)propyltrichlorosilane CH$_3$CH(CH$_2$Cl)CH$_2$SiCl$_3$, and chloromethyltrichlorosilane ClCH$_2$SiCl$_3$.

5. A method according to claim 1 in which the silicate is selected from the group consisting of apophyllite $KCa_4Si_8O_{20}(OH,F) \cdot 8H_2O$, $K_2CuSi_4l_0O$, magadiite $Na_2Sil4O_{29} \cdot 7H_2O$, kenyaite $Na_2Si_{22}O_{45} \cdot 9H_2O$, silinaite $NaLiSi_2O_5 \cdot 2H_2O$, and chrysotile $Mg_3(OH)_4Si_2O_5$.

6. An organopolysiloxane sheet or tube polymer prepared according to the method defined in claim 1.

7. A gel prepared by mixing the organopolysiloxane sheet or tube polymer prepared according to the method defined in claim 1, with a polar solvent, and allowing the mixture to stand at room temperature or above for a time sufficient for gelation to occur.

8. A gel according to claim 7 in which the polar solvent is selected from the group consisting of acetone, N,N-dimethylformamide, dimethyl sulfoxide, pyridine and N,lN-dimethylformamide, nitrobenzene, pyridine, 1-methyl-2-pyrrolidinone, and 1,3-dimethyl-3,4,5,6-tetrahydro-2(1H) pyrimidinone.

9. An article of manufacture comprising the organopolysiloxane sheet or tube polymer of claim 6 formed into a cast film, a coating, an extruded rod, an extruded fiber, a compression molded disc, or a machined compression molded disc.

10. A sheet or tube siloxane containing a single type of pendent organosilyl group having the formula $R^1R^2R^3Si-$, wherein $R^1$ is cyanoalkyl, acyloxy, or haloalkyl; and $R^2$ and $R^3$ are each independently an alkyl group containing 1–30 carbon atoms, an aryl group, an alkaryl group, an aralkyl group, cyanoalkyl, acyloxy, or haloalkyl.

11. An article of manufacture comprising the sheet or tube siloxane of claim 10 formed into a gel, a cast film, a coating, an extruded rod, an extruded fiber, a compression molded disc, or a machined compression molded disc.

* * * * *